Figure 1:
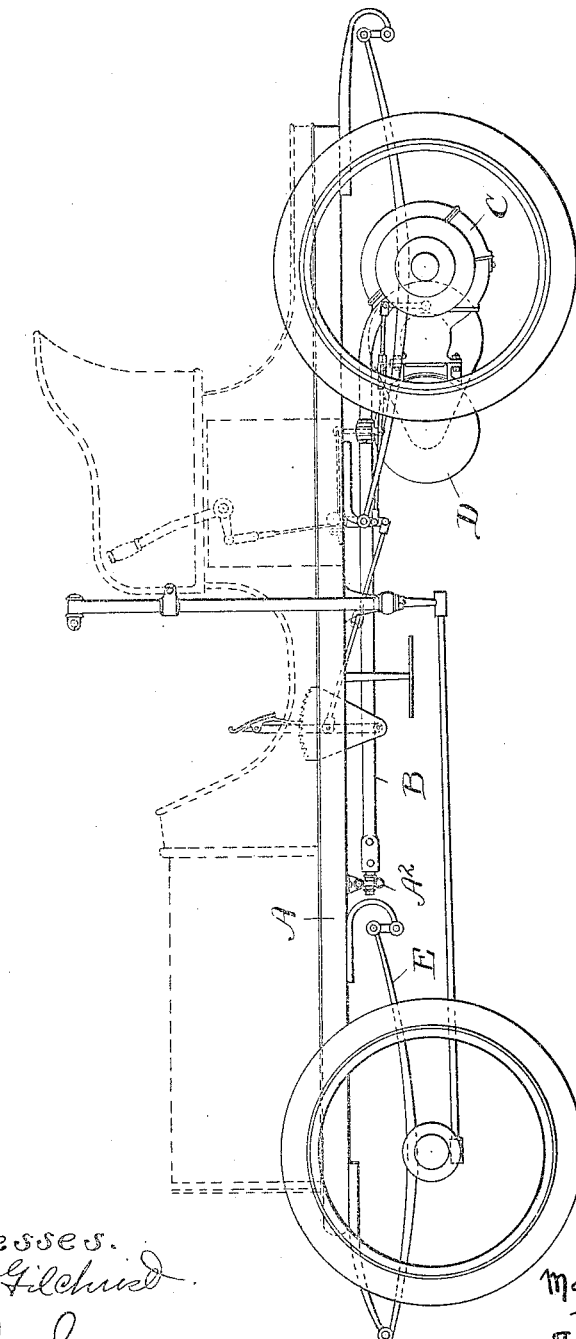

M. S. TOWSON.
AUTOMOBILE CHASSIS.
APPLICATION FILED APR. 1, 1909.

1,046,681.

Patented Dec. 10, 1912.
3 SHEETS—SHEET 1.

Witnesses.
E. B. Gilchrist
H. R. Sullivan

Inventor
Morris S. Towson
by Thurston Woodward
attys.

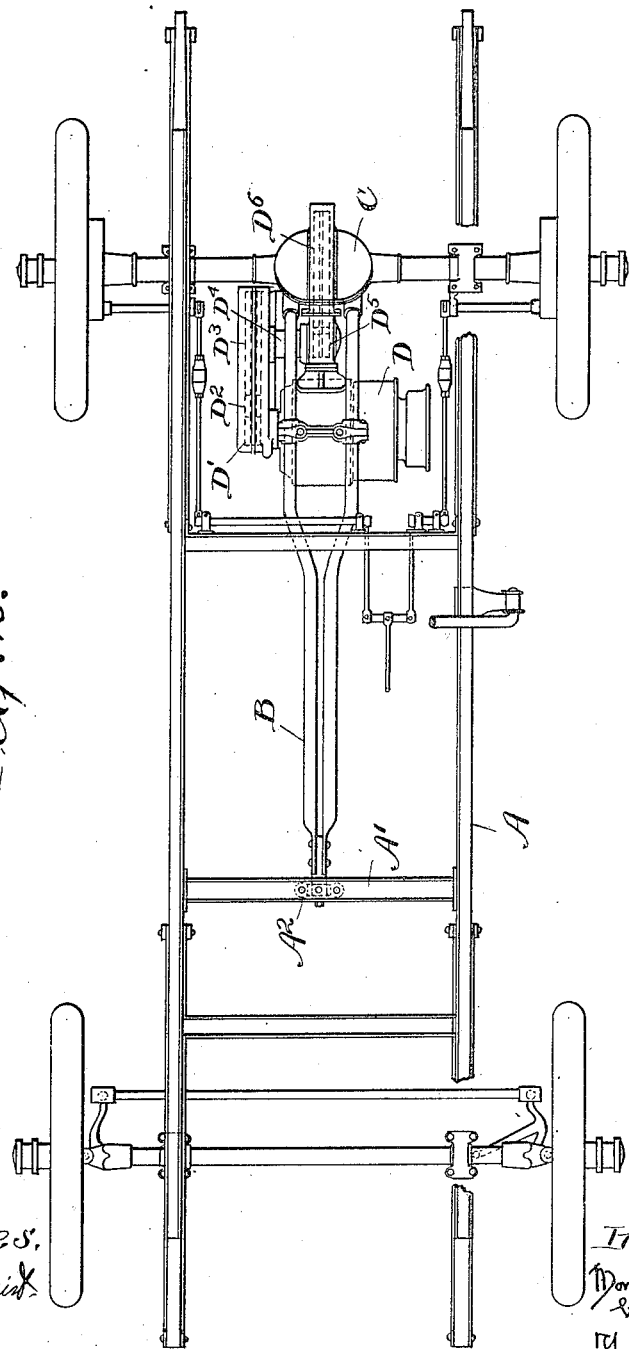

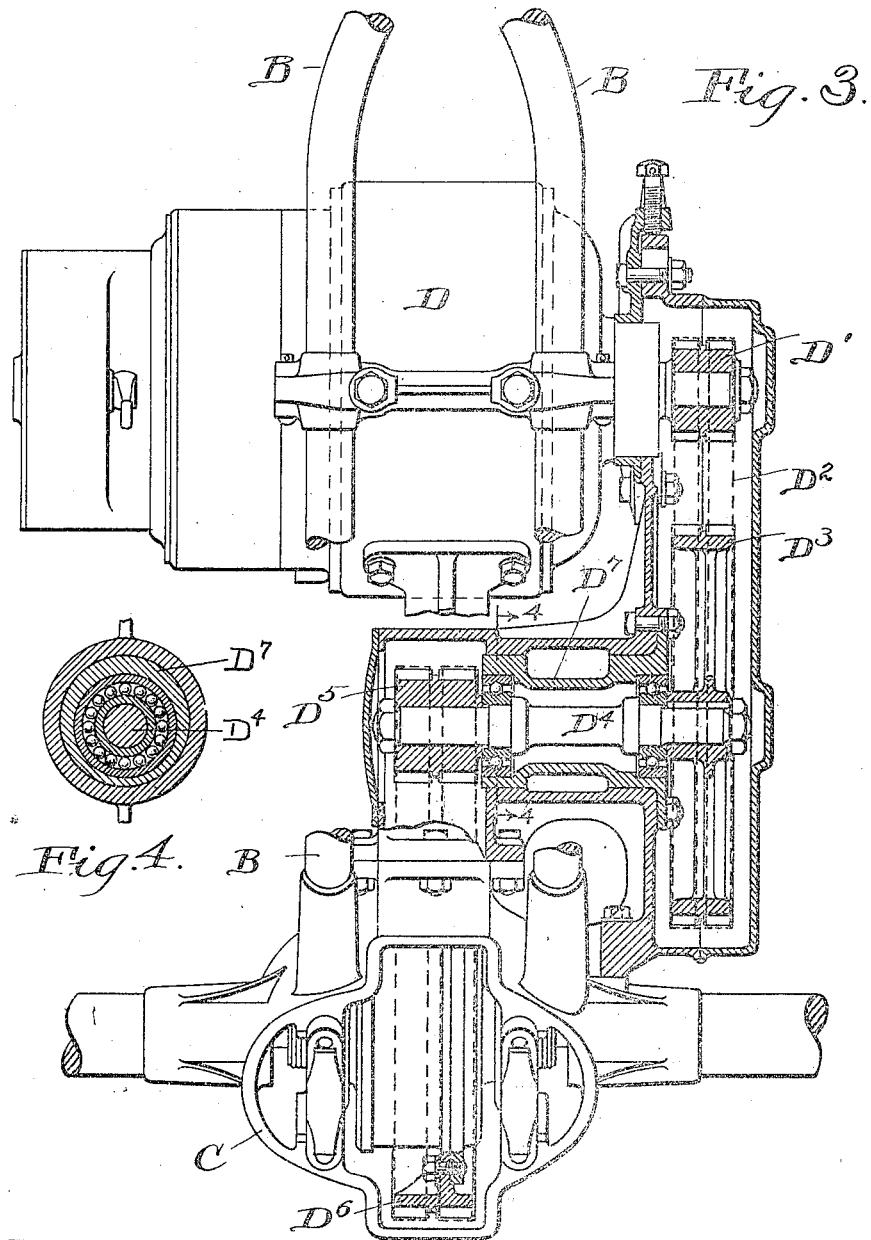

UNITED STATES PATENT OFFICE.

MORRIS S. TOWSON, OF CLEVELAND, OHIO.

AUTOMOBILE-CHASSIS.

1,046,681.  Specification of Letters Patent.  Patented Dec. 10, 1912.

Application filed April 1, 1909. Serial No. 487,188.

*To all whom it may concern:*

Be it known that I, MORRIS S. TOWSON, a citizen of the United States, residing at Cleveland, in the county of Cuyahoga and State of Ohio, have invented a certain new and useful Improvement in Automobile-Chassis, of which the following is a full, clear, and exact description.

The present invention relates to automobile construction and is more particularly directed to the disposition of the power plant of the machine.

An object of the invention has been to provide an arrangement wherein the power plant shall be hung so as to maintain its relationship to the driven parts, which relationship shall not be disturbed by reason of the strains and stresses to which the chassis is subjected in ordinary use.

A further object has been to so arrange the power plant as to lessen the effect of the vertical pounding of the load upon the rear tires during travel over rough roads, and it has been my purpose to achieve this object without impairing the efficiency of the apparatus or introducing a complicated structure.

A further object has been to provide means whereby the tension upon the springs caused by the tendency of the motor to travel around the rear axle shall be lessened.

A still further object has been to provide means whereby the power plant may be supported by a three point suspension system in such manner as to obviate possible distortion of the parts during travel.

The above objects and other desirable advantages it will be seen are attained by that embodiment of my invention described in the following specification and illustrated in the accompanying drawings, in which;

Figure 1 is a side elevation of the chassis of an electric automobile embodying my invention, the body of the vehicle being indicated in dotted lines. Fig. 2 is a plan view of the chassis partly broken away for the better illustration of the arrangement of parts. Fig. 3 is an enlarged plan view partly in section showing the details of the driving connections. Fig. 4 is a transverse section on the line 4—4 of Fig. 3, showing the eccentric location of the jack shaft bearings in the bushing in which they are mounted.

The frame A of the chassis here illustrated comprises a cross bar A' located preferably slightly forward of the middle of the machine, which cross bar has beneath the same a swivel support $A^2$. A reach B preferably formed of two tubes united together at their forward end extends between the swiveled support and the usual housing C inclosing the differential gearing and the rear axles. In the present case the two tubes forming the reach are caused to diverge somewhat at their rear end and are fitted into sockets on the housing for the differential gear. On the rear portion of this reach in front of the differential housing, is adjustably supported the power plant D, which, in the present instance, comprises an electric motor substantially inclosed.

As indicated in dotted lines in Fig. 2, the transmission from the motor to the differential gear comprises a sprocket D' on the end of the motor shaft communicating motion to a large sprocket $D^3$ on the end of a jack shaft $D^4$ through the medium of a chain drive $D^2$, which jack shaft has on its opposite end a sprocket $D^5$ connected by a chain with a sprocket $D^6$ on the drum of the differential. There is no inventive feature claimed for the specific character of transmission just described, and it is therefore unnecessary to dwell upon its structural features further.

The mounting for the jack shaft $D^4$ comprises a rotatably adjustable bushing $D^7$ in which the bearings for the said jack shaft are eccentrically located in such manner that by the rotation of the bushing the distance of the axis of the shaft from the axis of the differential sprocket may be varied, thus providing means for tightening the chain drive connection between the two when occasion may arise therefor. Any forward movement of the jack shaft for the purpose of tightening this drive connection would naturally result in loosening the chain drive connection between this same jack shaft and the motor shaft. When this occurs the motor is shifted forward along the reach, the connections between the motor and the housing for the driving chain being of such character as to permit this adjustment, as will be seen by reference to Fig. 3. This is a very decided advantage since by it I am enabled to maintain the proper driving conditions at all times without sacrificing any other desirable feature of the construction.

Owing to the fact that the entire power plant is supported by the reach which is itself freely oscillatable about the axis of the differential housing, it will be apparent that no amount of vertical vibration on the part of the frame of the vehicle will change the relationship of the power plant or any portion of it to the driven parts. The vertical play of the body with regard to the rear axle may take place to any extent without distortion of the connecting devices between the motor and the rear axle, owing to the above recited construction, by which the reach on which the power plant hangs, swinging freely about the rear axle. The swivel connections at the forward end of the reach, of course, eliminates strain upon the latter during the vibration of the body.

One of the advantages of the arrangement here shown for accomplishing the purpose outlined is that the parts are readily accessible at all times, it being quite easy to unstrap the motor casing from the reach and permit the plant to be swung downward away from the reach, for the purpose of convenient handling when this is desirable.

It will further be seen that, owing to the heavier part of the plant being located at some little distance in advance of the rear axle, and owing to the fact that the forward end of the reach is connected to the frame which is in turn supported on springs E, the vertical pounding blows of the power plant, which might otherwise be borne entirely by the rear tires, will be very greatly diminished and the life of the tires as well as the other portions of the apparatus will be greatly prolonged by the arrangement shown.

As above indicated, the structure by which I am enabled to throw the motor forward away from the rear axle gives a reduction in the strain placed upon the springs due to the well known tendency of the motor to travel around the rear axle, which tendency is a reactionary result of turning the axle forward under the load, which is a matter of advantage in electric vehicles in which the springs are comparatively light and sensitive.

In addition to the above advantages I would again call attention to the fact that the structure permits the maintenance of any desired tension upon the driving chains and also affords means by which the entire power plant is carried by a three point suspension with the forward point widely separated from the others so that the advantages of such a system are had in an effective form.

One of the most important advantages of supporting the power plant upon a reach as above described flows from the fact that by such construction I am enabled to interpose reduction transmission between the motor and the driving axle. By the use of reduction transmission I am enabled to employ a high speed motor, thereby greatly reducing the weight below that necessary for a motor having such low speed as would be practically necessary if it were geared directly to the driving axle. Such a saving in the weight of the motor is obviously of great benefit in prolonging the life of the tires, not to mention the reduction in the total mass to be propelled by the batteries.

Having thus described my invention, I claim:

1. A vehicle comprising front and rear axles, a frame supported by the axles, a casing surrounding the rear axle, a reach rigidly connected at its rear end with said casing and at its forward end yieldingly connected to the frame, a power plant supported by the reach and adjustable therealong, a reduction transmission between the power plant and the rear axle, a casing inclosing the transmission and rigidly connected with the axle casing, said transmission including a countershaft supported by the transmission casing between the power plant and the rear axle.

2. A vehicle comprising a pair of axles, a frame supported above the axles, one of said axles being a driving axle, a spring interposed between each of said axles and the frame, a reach oscillatably mounted on the driving axle and supported by the frame adjacent to the other axle, a longitudinally adjustable power plant hung on said reach, and transmission devices in a casing rigidly mounted on the reach and rear-axle casing, a counter shaft in said transmission casing sprocket-connected to the power plant at one side and to the rear axle at the other, with eccentric sleeve bearings for said shaft suitably mounted in said casing.

In testimony whereof, I hereunto affix my signature in the presence of two witnesses.

MORRIS S. TOWSON.

Witnesses:
H. R. SULLIVAN,
G. C. PHILLIPS.